(No Model.) 6 Sheets—Sheet 1.
D. G. PROCTOR.
AIR COOLING AND PURIFYING APPARATUS.
No. 489,033. Patented Jan. 3, 1893.
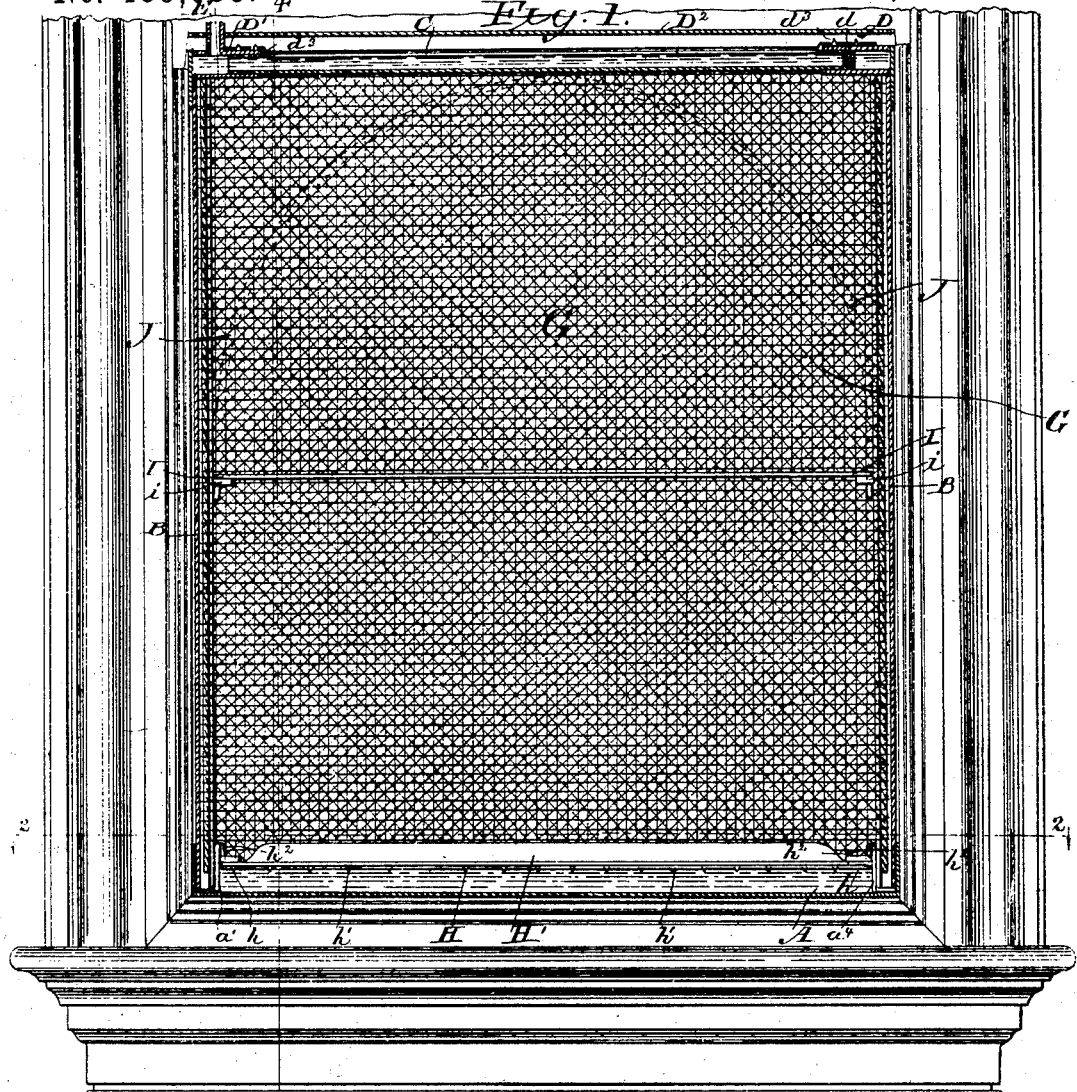
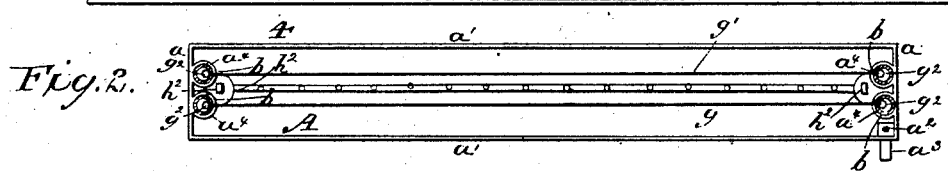
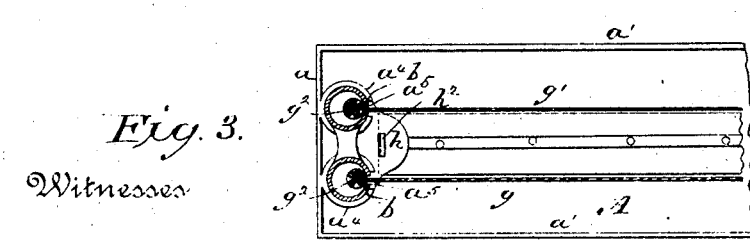
Witnesses
Inventor
David G. Proctor,
By his Attorneys (No Model.) 6 Sheets—Sheet 2.

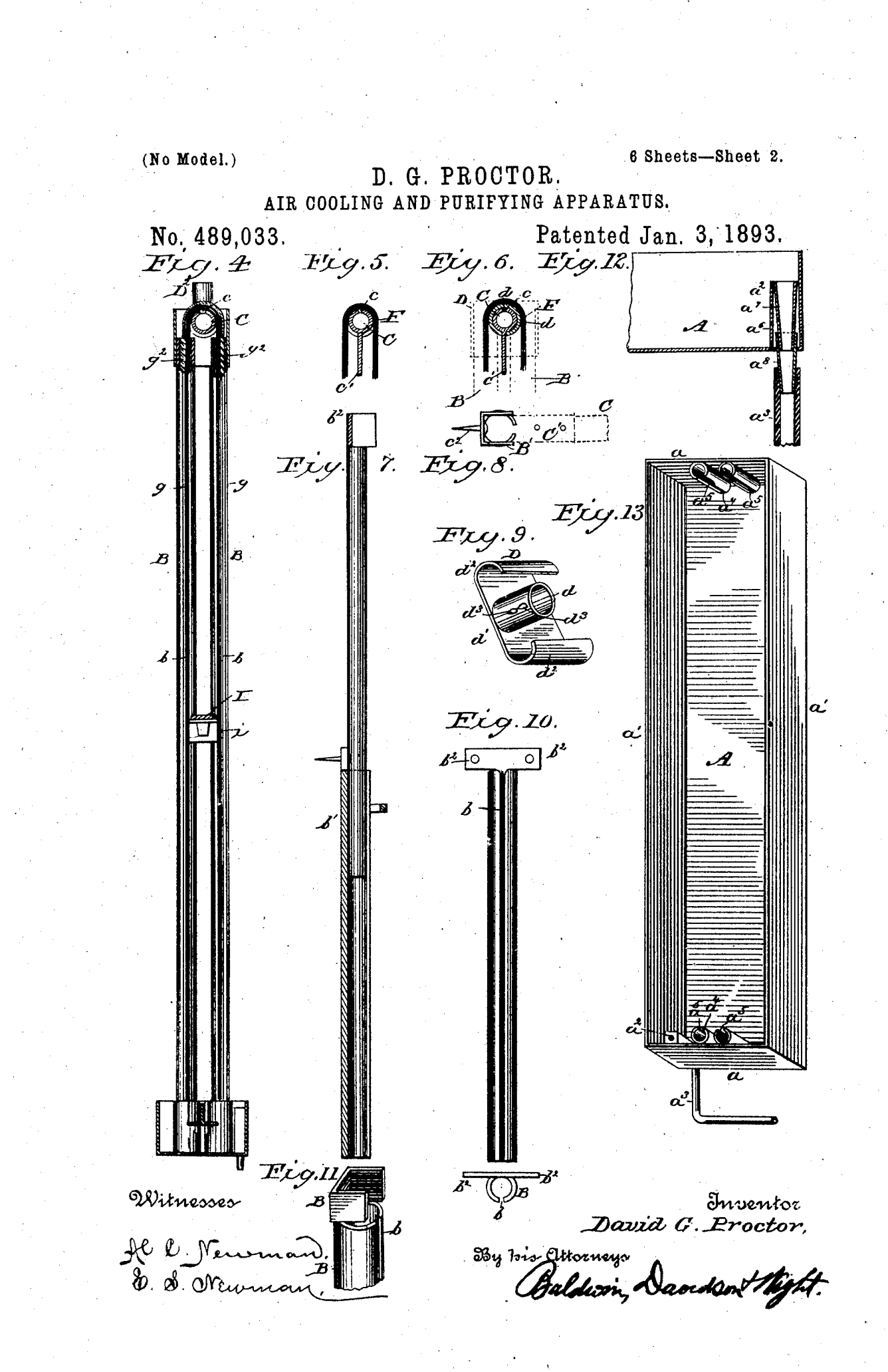

D. G. PROCTOR.
AIR COOLING AND PURIFYING APPARATUS.

No. 489,033. Patented Jan. 3, 1893.

(No Model.) 6 Sheets—Sheet 3.
D. G. PROCTOR.
AIR COOLING AND PURIFYING APPARATUS.
No. 489,033. Patented Jan. 3, 1893.
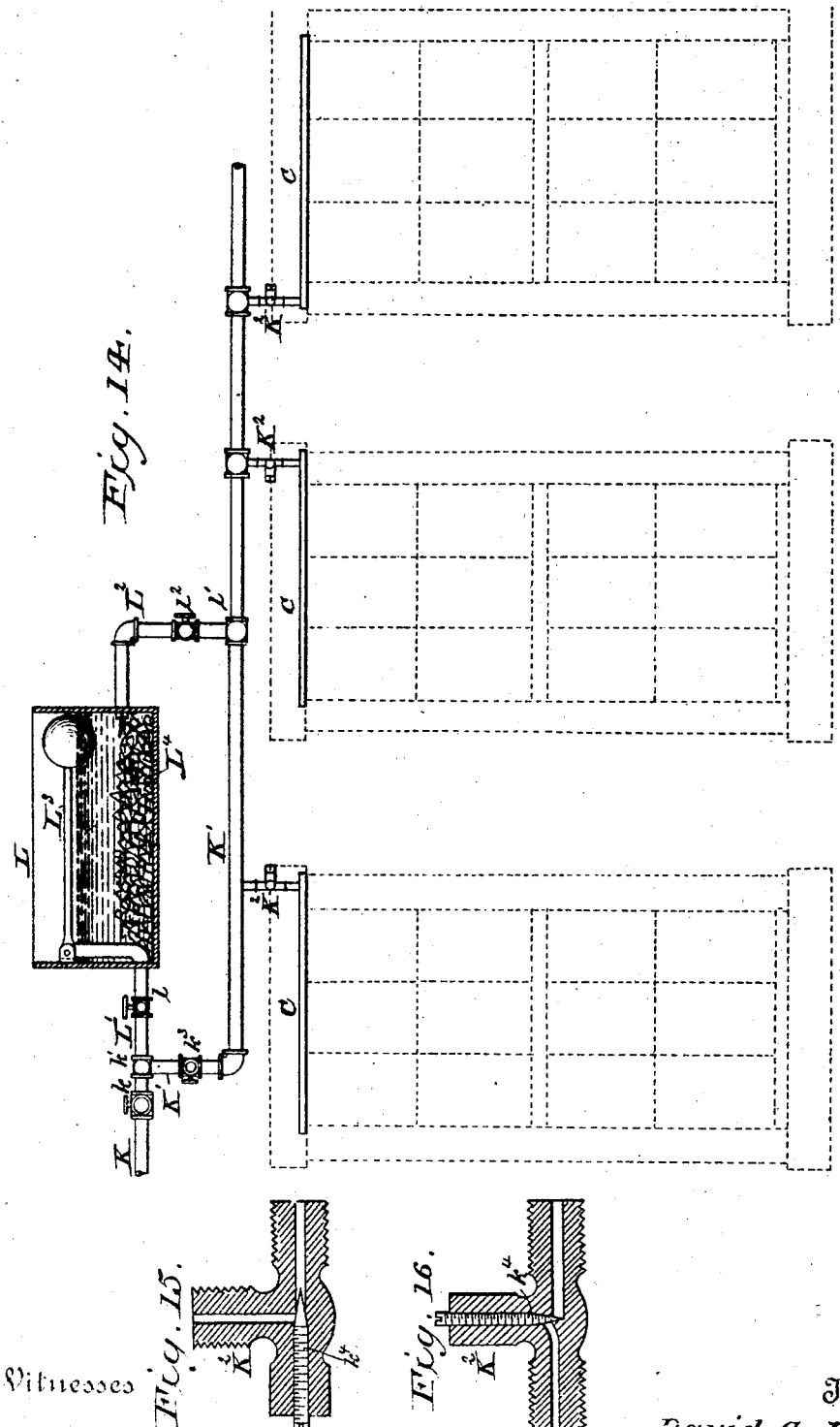
Witnesses
K. L. Newman
E. S. Newman
Inventor
David G. Proctor,
By his Attorneys
Baldwin, Davidson & Wight

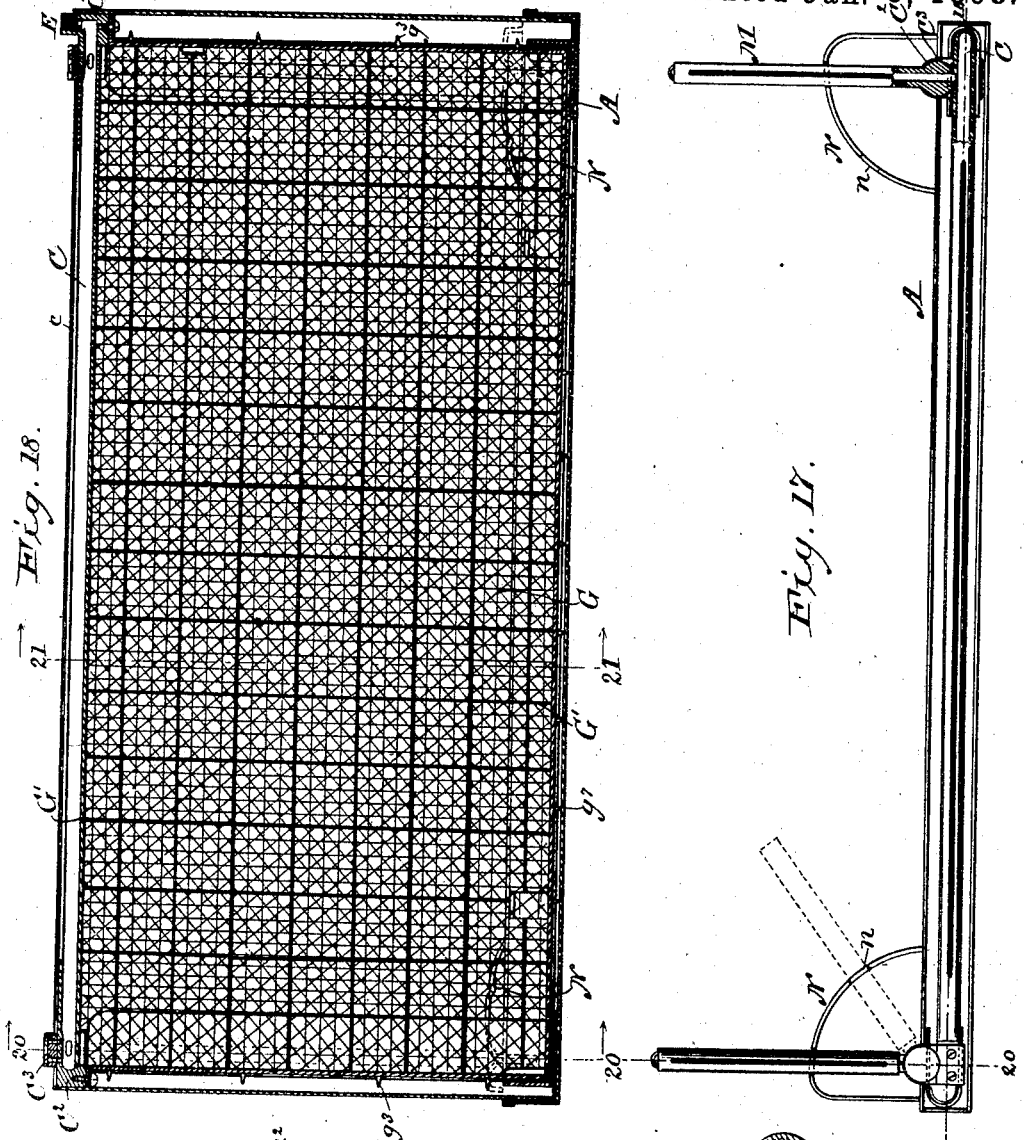

(No Model.) 6 Sheets—Sheet 5.
D. G. PROCTOR.
AIR COOLING AND PURIFYING APPARATUS.
No. 489,033. Patented Jan. 3, 1893.
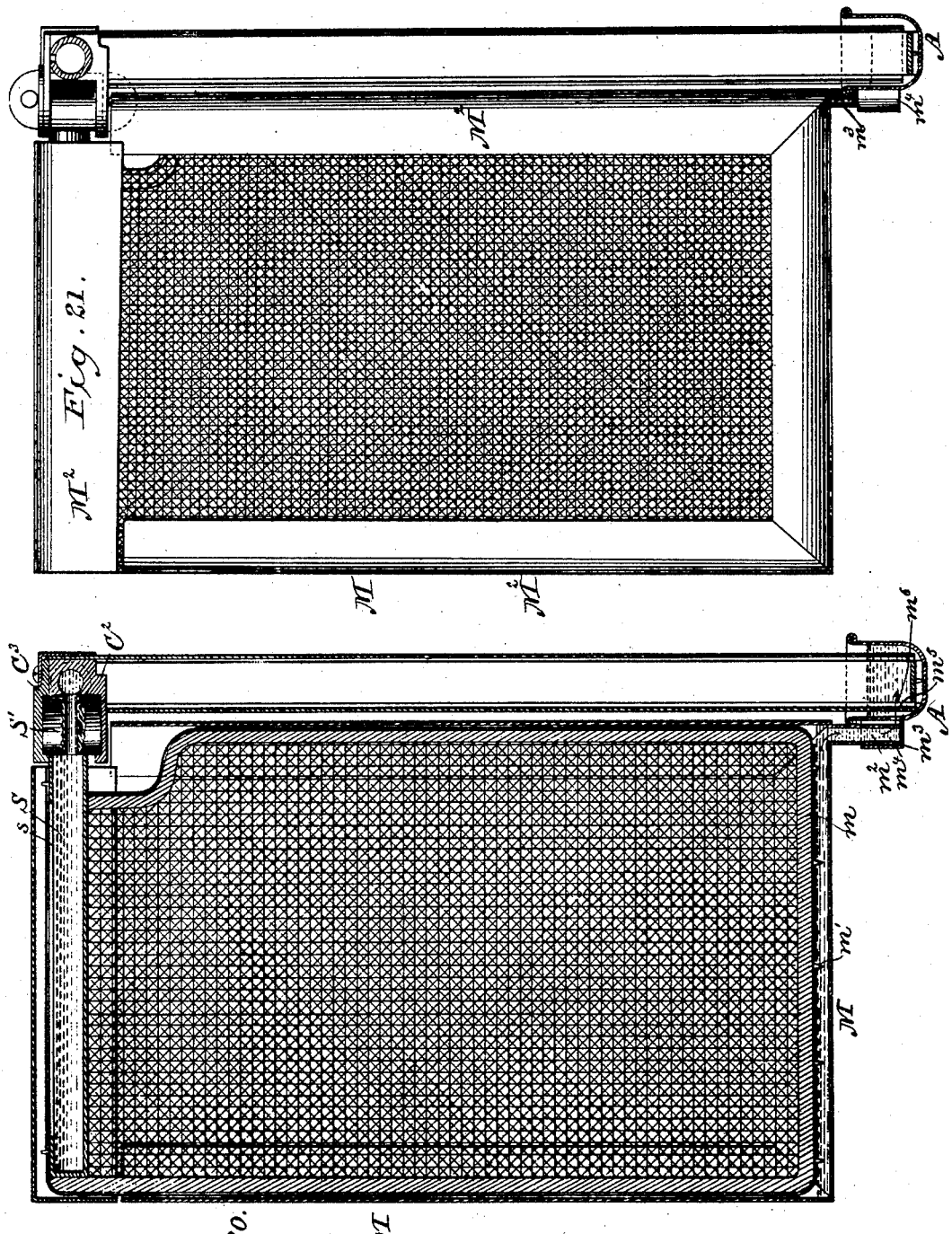
Witnesses
H. C. Newman.
E. S. Newman.
Inventor
David G. Proctor,
By his Attorneys
Baldwin, Davidson & Wight (No Model.) 6 Sheets—Sheet 6.
D. G. PROCTOR.
AIR COOLING AND PURIFYING APPARATUS.
No. 489,033. Patented Jan. 3, 1893.
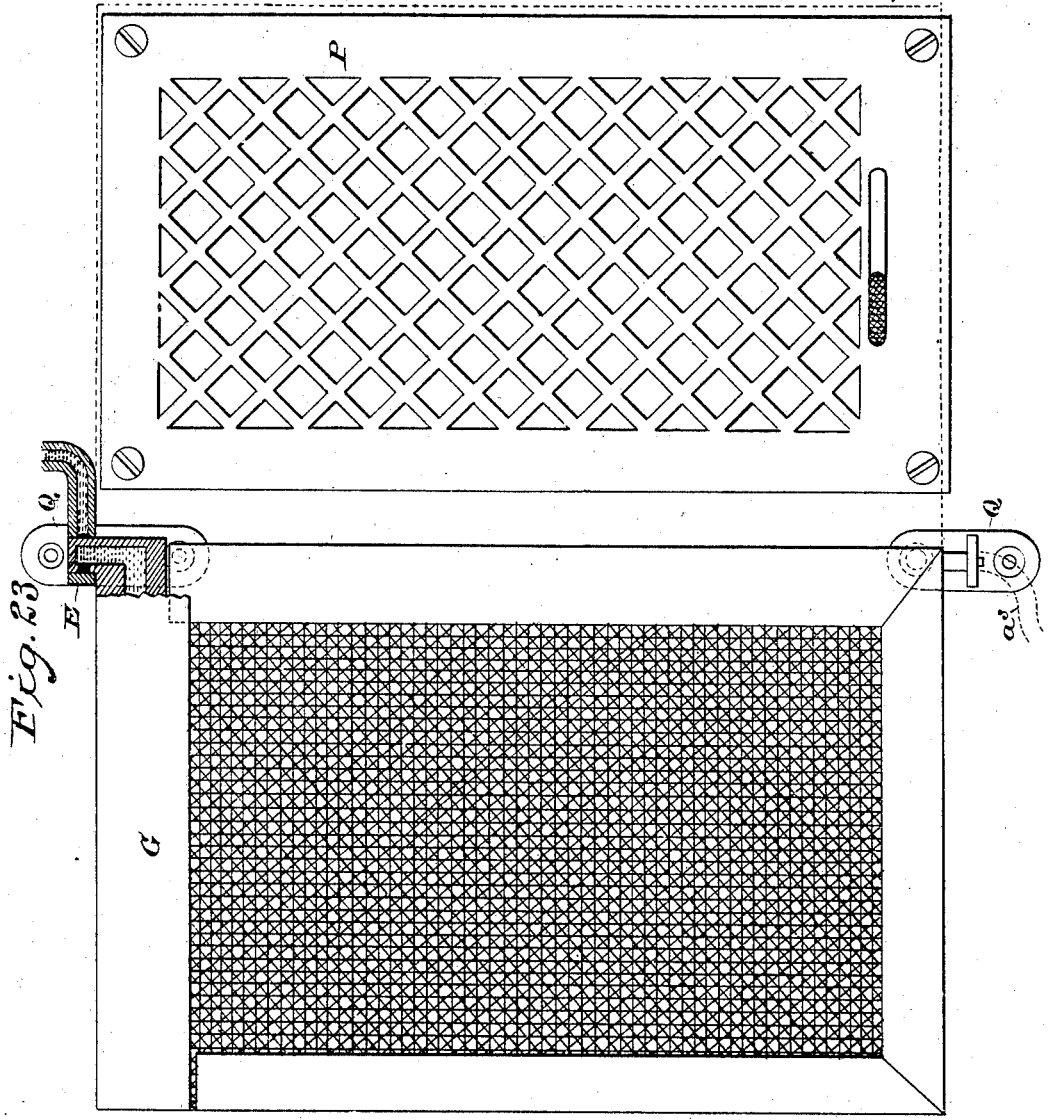
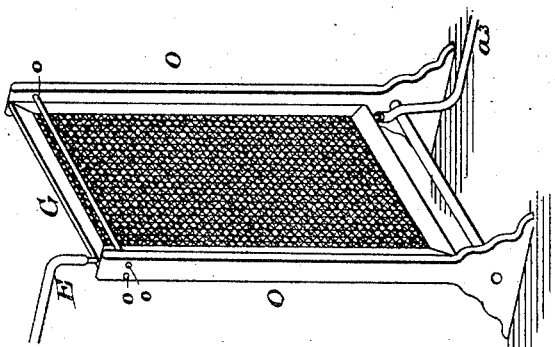
Witnesses
H. C. Newman.
E. S. Newman
Inventor
David G. Proctor,
By his Attorneys
Baldwin, Davidson & Wight.

UNITED STATES PATENT OFFICE.

DAVID GILL PROCTOR, OF WASHINGTON, DISTRICT OF COLUMBIA.

AIR COOLING AND PURIFYING APPARATUS.

SPECIFICATION forming part of Letters Patent No. 489,033, dated January 3, 1893.

Application filed July 12, 1889. Serial No. 317,349. (No model.)

*To all whom it may concern:*

Be it known that I, DAVID GILL PROCTOR, a citizen of the United States, residing at Washington, District of Columbia, have invented certain new and useful Improvements in Air Cooling and Purifying Apparatus, of which the following is a specification.

The object of my invention is to cool and purify air, which I propose to do by providing improved apparatus for cooling and purifying the air before its entrance into a room, car, or building, by interposing a screen of an improved construction supplied with a cooling agent, such as water through which the air passes on its way to a room or compartment. My improved screen may also be used inside a room or in any other suitable place, to cool the air by the evaporation of the cooling agent in the screen. I also propose to use with my improved screen a germicide or disinfectant to free the air from disease germs and other impurities, in places and at times when it is necessary or desirable.

My invention consists in the improved devices and organizations of instrumentalities hereinafter described and claimed.

In the accompanying drawings—Figure 1 is a vertical, central section through my improved screen, showing it applied to a window-frame; Fig. 2 is a cross-section on the line 2—2 of Fig. 1; Fig. 3 is a similar view on an enlarged scale of part of the lower end of the screen; Fig. 4 a transverse, vertical section on the line 4, 4 of Fig. 1; Fig. 5 a detail view of the upper part of the screen; Fig. 6 is a detail view of the upper part of the screen in section; Fig. 7 is a detail view showing extensible end tubes or frames; Fig. 8 is a top view of one of the end tubes or frame-pieces, showing the manner of connecting it with the horizontal top-tube; Fig. 9 is a detail view of one of the coupling-devices; Fig. 10 is a detail view of one of the frame-sections; Fig. 11 is a detail view of the upper end of one of the frame-tubes showing in perspective the devices for coupling it with the horizontal top tube; Fig. 12 a detail view showing one way of connecting the drip-pipe with the bottom trough of the screen; Fig. 13 is a perspective view of the bottom or drip-trough; Fig. 14 is a diagram view showing how the screens in the windows may be attached to a water supply pipe, and showing also a tank from which the water may be supplied and which may contain a germicide, disinfectant, or the like; Figs. 15 and 16, are detail views of pipe-couplings and valves which may be employed for regulating the admission of the water or other cooling and disinfecting agent to the screens; Fig. 17 is a top view of a screen partly in section showing side screens or wings attached thereto; Fig. 18 is a vertical, central section through the screen on the line 18—18 of Fig. 17; Fig. 19 is a detail view partly in section showing the hinge-connection between the main screen and one of the side screens; Fig. 20 is a vertical central section through one of the side screens on the line 20—20 of Figs. 17 and 18; Fig. 21 is an elevation of one of the side screens showing the connections with the main screen partly in section; Fig. 22 is a perspective view of a movable frame with my improved screen attached; Fig. 23 is a diagram view showing the manner of applying my improved screen to a hot-air register.

I will first refer to the screen as adapted for use in a window-frame.

The framing of the screen is preferably formed in the following manner;—A trough A, is arranged along the bottom and is provided with closed end walls $a$, and side walls $a'$. An over-flow or outlet opening $a^2$, is provided at one end of the trough which communicates with a drip-pipe $a^3$, which may be of a sufficient length to carry the small amount of water which may pass from the trough to any suitable distance out of the way. At each end of the trough I provide short pipes or nipples $a^4$, which extend vertically from the bottom of the trough to about the same height as the sides $a'$. These tubes or nipples are slit or slotted at $a^5$, for a purpose hereinafter described. I have shown in the drawings two nipples at each end of the trough, but a greater or less number may be used. The side tubes B, shown in detail in Fig. 4, fit into the nipples $a^4$, which hold them in place. The side tubes B, extend to the top of the screen where they are connected with the top cross or supply tube C.

While I have shown tubes as constituting the side pieces of the frame, it will be understood that it is not designed to admit water to the side tubes, but tubes are used as being light and strong and as affording a convenient means for attaching the screen to the frame, as will be hereinafter more fully described.

The side tubes B, or trough may be connected to the supply tube C, in any suitable way. As shown in the drawings the connection is made by means of couplings D, and D'. The coupling D, shown in detail in Fig. 9, consists of a short tube or nipple $d$, into which the end of the tube C, fits, and of a back piece $d'$, having curved end wings $d^2$, into which the side tubes extend. The rear end of the tube $d$, is closed, and the end of the tube C, may be plugged as indicated in dotted lines to avoid any possibility of leakage. The coupling D', is formed in substantially the same way as the coupling D, except that an inlet pipe E, connects with it and the end of the tube C, which enters the coupling D' is open so that the water may pass from the inlet E, into and along the pipe or tube C freely. The inlet pipe E, may connect with the water supply pipe of a building as indicated in Fig. 14, or with a tank as illustrated in the same figure. The tube C, is slit, slotted or open on its upper side as indicated in Figs. 4 and 5, the opening preferably terminating a short distance from the ends to prevent the fluid from overflowing when it abuts against the plugs or ends of the tube. One or more layers of a fine fabric F, is stretched over the slotted side of the tube. By this means when water is supplied to the tube it is prevented from flowing out through the slot or opening rapidly, but may soak through the fabric which is preferably of very fine texture, to finely divide the water as it flows through it. The main body G of the screen is preferably made of sheets of soft absorbent textile fabric reticulated with open transparent mesh as shown to permit the free passage of air and light.

In the drawings, I have shown the body of the screen as consisting of two sheets $g, g'$, arranged a suitable distance apart. Each sheet is secured at each side to a cord or small rope $g^2$. These cords are arranged within the side tubes B, and the sheets $g, g'$, extend through the slits $b$, in the side tubes. This secures the body of the screen at the sides. At the bottom the two sheets $g, g'$, are secured together and pass under a horizontal crosspiece H, secured to brackets $h$, in the ends of the trough A. The cross-piece H, is provided with a row of sharp-jointed studs or pins $h'$, along the bottom to engage with the sheets $g, g'$. The cross-piece H, is shown as connected to the brackets $h$, by upwardly projecting lugs $h^2$, which extend upwardly through perforations in brackets. A rib H', extends upwardly from the cross-piece H, and serves to strengthen it. About half way up a cross-piece I, is located, which serves to keep apart the sheets $g, g'$, and also to brace the sides of the frame. The cross-piece or brace I, is shown as secured to brackets $i$, secured to the side tubes. I have shown also in Fig. 1, by dotted lines J, an arched brace which extends from the brackets $i$ to the bottom of the top cross tube C, and may be used to support the central portion of the tube and also to keep apart the sheets $g, g'$. The sheets $g, g'$, are connected with the layers F, of the fine fabric, so that when water flows from the tube C, through the fabric, it will find its way down into and through the sheets $g, g'$ of the body of the screen. The tubes $d$, of the couplings D, and D', are provided with short upwardly projecting spurs $d^3$, which engage with the sheets or netting $g, g'$, and aid in holding it in place.

A U-shaped metallic casing $D^2$, is preferably employed for covering the top of the frame over the tube C, as indicated in Figs. 1 and 4, and the inlet pipe E, extends through the casing $D^2$, at one end.

An important feature of my invention is that the water or other similar cooling agent is supplied to the screen under pressure. It is forced through the slit $c$, in the tube C, and then by gravity and capillary attraction finds its way through the screen and such as is not evaporated drips down into the bottom trough A, and should the trough become full, or nearly full, the water will flow out through the waste opening $a^2$, and drip-pipe $a^3$, but the flow of water through the screen may be regulated so that there shall be very little if any overflow.

In Figs. 5 and 6, the tube C, is shown as provided with a downwardly projecting rib $c'$, which serves to stiffen and strengthen the tube.

In Figs. 8, and 11, a modified way of connecting the cross tube C, to the upright or side tube B, is shown. In this instance, the tube B, is shown as provided at its upper end with a three-sided top piece B', into which the squared end C', of the tube C, projects and rests. $c^2$, indicates a tack or nail by means of which the screen may be secured to a window-frame.

In Figs. 7 and 10, means are shown for varying the size of the screen. The tubes are made in sections and have a telescopic joint $b'$. The tubes are also shown as provided with laterally projecting wings $b^2$, provided with apertures through which tacks may be driven to secure the screen to a window-frame.

In Fig. 12, I have shown one way in which the drip-pipe $a^3$, may be connected to the overflow opening $a^2$. A pipe $a^6$ extends vertically from the bottom of the trough A, at one end and within the pipe $a^6$, is arranged a conical pipe $a^7$, fitting closely the opening in the pipe $a^6$, at the top and tapering downwardly, its reduced lower end fitting into a conical coupling tube $a^8$, which in turn extends into the drip-pipe $a^3$.

In Fig. 14, I have shown how the screens may be connected with a water supply pipe. Here K, indicates the water supply pipe and C, the top tubes of the screens. The pipe K, is provided with a valve $k$, and a coupling $k'$ connects the pipe K, with a branch pipe K', which supplies the screens through branches $K^2$. A valve $k^3$, is arranged in the pipe K', near its connection with the pipe K, by which means the supply of water to the screens may be turned on or off when desired. A tank L, is shown as connected with the pipe K, at the coupling $k'$, by means of a pipe L', in which is a valve $l$, for opening and closing communication with the water supply. The tank L, is provided with an outlet pipe $L^2$, which connects by coupling $l'$, with the screen supply pipe K'. A valve $l^2$, controls the flow of water from the tank to the pipe K'. The tank is also shown as provided with an ordinary float valve $L^3$, to automatically control the flow of water to the tank so that it shall not overflow. In the bottom of the tank, I have indicated a disinfecting or germicide substance $L^4$, such as will dissolve in the water before its passage into the screen supply pipe K'. By this organization pure water may be supplied directly from the main water supply pipe K, to the screen or through the tank L. The valves $K^2$, for regulating the flow of water to the screens are preferably such as indicated in Figs. 15 and 16. It is desirable that the valves should regulate with precision the flow of water to the screens so that the proper amount of water shall be supplied to them. I prefer to employ a coupling in which the communication between the supply and the screen is regulated by a needle-valve $k^4$, the shank of which is screw-threaded as shown and may be readily adjusted.

In some cases it is desirable to provide laterally projecting screens in connection with the main screen. This is especially desirable for railway cars, where there is a strong side draft, because a larger amount of cinders, dust, and other impure matter is carried by the air and the side screens will separate the bulk of the dust &c., from the air before it comes in contact with the main screen. These side screens are self clearing—i.e. when used on cars the dust will be shaken off by the motion of the car. I have shown an arrangement of side screens in Figs. 17 to 21.

The main screen G, may be of substantially the same construction as that described in connection with Fig. 1, but in this instance, I have shown crossed wires G' between the sheets of net-work. In this instance also, the netting is arranged over a frame $G^2$, extending along the bottom and at the sides of the screen and provided with spurs $g^3$, to engage with the netting. The top cross tube C, is provided with a slit $c$, over which sheets or strips of fine absorbent material are drawn and which connect with the netting. The tube C, connects at one end with an inlet pipe E. The frame rests in a trough A, at the bottom. Laterally projecting wings or side screens M, are connected with the main screen G, by a hinge-joint as shown in detail in Fig. 19. The side screens each consist of a frame $m$, extending along the bottom and along each side of the screen and at the top connected with the top cross tube S, which is slotted at $s$, and is connected with the netting as in the other screens. The netting is stretched around the frame $m$, which is provided at the bottom with spurs $m'$, for holding the netting in place. A trough M' is arranged under the bottom of the screen and an outlet $m^2$, is provided through a short vertical pipe $m^3$, which fits in a socket $m^4$, on the end of the trough A, of the main screen. An opening $m^5$, in the tube $m^3$, communicates with an opening $m^6$, in the trough, and drip water may pass from the pipe $m^3$, into the trough A, as indicated by the arrow. Sheet-metal strips $M^2$, are arranged around the edges of the screen as indicated clearly in Fig. 21. The tube S, in the top of the side screen is provided with a vertical cylindrical end piece S', which fits a corresponding socket $C^2$, in the end of the tube C, of the main screen. A cap $C^3$, is secured over the end S', to the socket piece $C^2$, on the end of the tube C. This end piece or socket is formed to extend laterally from the tube C, and the wall $C^4$ is curved and serves to close communication between the main screen and the side screens as will be hereinafter described.

The tube C, of the main frame opens into the end piece or socket $C^2$, and the cylindrical end piece S', of the side screens is provided with a transverse opening $s'$, which when the side wings are extended as shown in Fig. 17, communicates with the opening in the end piece $C^2$, so that water may pass from the main screen to the side screen, but when the side wings are closed in as shown in dotted lines in Fig. 19, communication between the main screen and the side screen is automatically closed. The side screens may be held in any desired position by means of catches N, attached to the bottom of the main screen and provided with notches $n$, with which the bottoms of the side screens engage. These catches are preferably made of resilient wire and are inclined as shown, so as to readily yield when the side screens are moved in and out positively, but are sufficiently firm to hold the screens in the position to which they are set.

The hinge-connection for the lower end of the screen is formed by the pipe $m^3$, and the socket $m^4$, in which it is free to turn.

In Fig. 22, I have indicated how my improved screen may be applied to a movable frame which may be placed in any desired position in a frame or elsewhere, where it is desired to cool or purify the atmosphere by the evaporation of the liquid supplied to the screen. The uprights O, of the screen are arranged to receive between the cross pieces $o$, the screen G, which may be put in and taken out at will. E indicates the inlet pipe which may connect with a water supply main or with any other water supply and $a^3$, indicates the outlet or waste pipe.

In Fig. 23, P, indicates a hot-air register, and G, indicates one of my screens hinged in brackets Q, attached to the wall at the side of the register. Water may be supplied through the inlet pipe E, and pass out through the waste pipe $a^3$. Substantially the same form of hinge-connection may be provided for the screen as that shown in Fig. 19, so that in the act of swinging the screen on its hinge, the supply of water may be turned on or off. The screen is so arranged that it will when desired be swung around in front of the register as indicated in dotted lines, so that air from the register passes through the screen and is purified before passing into the room. When not in use the screen is swung away from the register and the supply of water is cut off as above stated.

I have shown and described some of the ways in which my invention may be practically applied. Obviously, the details of construction and the manner of applying my invention may be varied, but I deem the organizations herein set forth, simple, efficient, and entirely practicable.

Having thus described the construction and operation of my improved apparatus for cooling and purifying air, I declare that what I claim as my invention is—

1. The combination, substantially as hereinbefore set forth, of a supply pipe or trough open at the top, a screen of absorbent open meshed reticulated material, a strip or sheet of textile fabric of fine mesh arranged over the opening in the supply pipe, and connected with the screen, and means for supplying fluid to the supply pipe.

2. The combination, substantially as hereinbefore set forth, of a window frame, a screen of absorbent open meshed reticulated material between the sides of the window frame, a supply pipe or trough open at the top, fine absorbent material arranged over the opening, and connected with the screen, a trough at the lower end of the screen having a waste opening therein, a pipe connected with the water pipes of a building for feeding water to the supply pipe, and a valve therein for regulating the feed.

3. The combination, substantially as hereinbefore set forth, of a supply pipe or trough having an opening extending part way along the top of the tube or trough, but closed at each end thereof, fine reticulated material arranged over the opening to permit fluid supplied to the pipe to be delivered therefrom, and a screen of open work reticulated material connected with the fine absorbent material.

4. The combination, substantially as hereinbefore set forth, of a screen, the body of which is composed of reticulated absorbent material, a slotted supply pipe at the top of the screen communicating with the absorbent material, a tank containing an air purifying substance, a pipe through which water is supplied to the tank, a pipe extending from the tank to the screen, a pipe extending from the pipe which supplies fluid to the tank to the screen, whereby the fluid may be delivered to the screen either through the tank or to the screen directly without passing through the tank.

5. The combination, substantially as hereinbefore set forth, of a screen, the body of which is composed of open work reticulated absorbent material, a slotted water supply pipe or trough at the top of the screen, fine reticulated material arranged over this opening, and connected with the body of the screen, a tank containing an air purifying substance, a main water supply pipe connected with the tank, a valve for opening and closing the connection between the tank and the main water supply pipe, a pipe leading from the tank to the screen, a valve for opening and closing the connection between the pipe and the screen, a pipe leading from the main water supply pipe to the screen, and a valve for opening and closing this pipe, whereby fluid may be delivered to the screen either through the tank or directly from the water supply pipe without passing through the tank.

6. The combination, substantially as hereinbefore set forth, of the side pieces of the screen, the bottom trough, the slotted pipe tube, the strips or sheets of fine absorbent material arranged over the slot in the top tube, and the sheets of reticulated absorbent material constituting the body of the screen and secured to the framing.

7. The combination, substantially as hereinbefore set forth, of the slotted side tubes, the body portion of the screen composed of absorbent material and extending through the slot in the tubes, and the slotted tube through which water is supplied to the body of the screen.

8. The combination, substantially as hereinbefore set forth, of the bottom trough, the nipples at each end thereof, the tubes or side pieces connected with the nipples, the top cross tube and a coupling at each end of the cross tube, provided with a short tube engaging with the top cross tube and with curved ends engaging with the side tubes.

9. The combination, substantially as hereinbefore set forth, of the bottom trough, the slotted side tubes, the slotted top cross tube, couplings connecting the top tube with the side tubes, an inlet opening at one end of the screen to the cross tube, the covering $D^2$, for the top tube, the waste pipe connected to the bottom trough, and the main body of the screen composed of absorbent material to which water is supplied from the top cross tube.

10. The combination, substantially as hereinbefore set forth, of the slotted side tubes, one pair on each side of the screen, sheets of reticulated absorbent material, to the side edges of which cords or ropes are secured, and which are arranged within the tubes, the top cross tube provided with an opening on its upper side, a strip of fine absorbent material arranged over the opening in the top cross tube and communicating with the body of the screen and cross pieces or braces arranged between the sheets of the body of the screen.

11. The combination, substantially as hereinbefore set forth, of the slotted telescopic side tubes provided with laterally projecting wings $b^2$, the top cross tube, the bottom trough, and sheets of reticulated absorbent material arranged between the bottom trough, the top tube and the telescopic side tubes.

12. The combination, substantially as hereinbefore set forth, of the main screen and a side screen hinged thereto, and supplied with water through its hinge-connection with the main screen.

13. The combination, substantially as hereinbefore set forth, of a window-frame, the main screen stretched between the sides of the window-frame, side-screens, one, hinged to each end of the main screen and devices for supplying water to the main and the side-screens.

14. The combination, substantially as herein before set forth, of the main screen having a slotted water supply pipe at the top which communicates with an inlet opening at one end, a side screen also provided with a slotted water supply pipe at the top hinged to the main screen and communicating through the hinge to the water supply pipe in the main screen.

15. The combination, substantially as hereinbefore set forth, of the main screen having a slotted water supply pipe at the top, which is formed with an end piece $C^2$, a side screen having a slotted water supply pipe at the top provided with a cylindrical end piece $S'$, connected with the end piece $C^2$, and provided with an opening which communicates through an opening in the end piece $C^2$, with the slotted supply pipe in the main-screen.

16. The combination, substantially as hereinbefore set forth, of a screen formed with a slotted supply pipe at the top hinged to its support and provided with a water opening which communicates with a water opening in the support.

In testimony whereof I have hereunto subscribed my name.

DAVID GILL PROCTOR.

Witnesses:
  LLOYD B. WIGHT,
  M. J. KELLEY.